(12) United States Patent
Chang et al.

(10) Patent No.: US 10,542,511 B2
(45) Date of Patent: Jan. 21, 2020

(54) METHOD AND APPARATUS FOR PRIMARY SYNCHRONIZATION IN INTERNET OF THINGS

(71) Applicant: ELECTRONICS AND TELECOMMUNICATIONS RESEARCH INSTITUTE, Daejeon (KR)

(72) Inventors: Kapseok Chang, Daejeon (KR); Moon-Sik Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 45 days.

(21) Appl. No.: 15/670,294

(22) Filed: Aug. 7, 2017

(65) Prior Publication Data
US 2018/0041978 A1 Feb. 8, 2018

(30) Foreign Application Priority Data

Aug. 8, 2016 (KR) .................. 10-2016-0100909
Aug. 7, 2017 (KR) .................. 10-2017-0099569

(51) Int. Cl.
*H04W 56/00* (2009.01)
*H04L 5/00* (2006.01)
*H04L 27/26* (2006.01)
*H04L 27/18* (2006.01)

(52) U.S. Cl.
CPC .......... *H04W 56/004* (2013.01); *H04L 5/003* (2013.01); *H04W 56/001* (2013.01); *H04L 27/18* (2013.01); *H04L 27/2613* (2013.01)

(58) Field of Classification Search
CPC .... H04W 56/004; H04W 56/001; H04L 5/003
See application file for complete search history.

(56) References Cited

U.S. PATENT DOCUMENTS

| | | | | |
|---|---|---|---|---|
| 2002/0065047 | A1* | 5/2002 | Moose | H04L 5/0048 455/67.11 |
| 2008/0043858 | A1* | 2/2008 | Lim | H04J 11/00 375/260 |
| 2008/0122692 | A1* | 5/2008 | Houtman | G01S 19/29 342/357.68 |
| 2013/0094457 | A1 | 4/2013 | Seo et al. | |
| 2013/0176952 | A1* | 7/2013 | Shin | H04L 5/001 370/329 |

(Continued)

FOREIGN PATENT DOCUMENTS

KR  10-1302462 B1  9/2013

OTHER PUBLICATIONS

Intel Corporation, "On device complexity for NB-IoT", 3GPP TSG RAN WG1 Meeting #83, R1-156524, Anaheim, USA, Nov. 16-20, 2015.

*Primary Examiner* — Khaled M Kassim
*Assistant Examiner* — Syed Ali
(74) *Attorney, Agent, or Firm* — LRK Patent Law Firm

(57) ABSTRACT

A method and an apparatus for primary synchronization in the Internet of things. A receiver samples a primary synchronization signal into a digital signal to generate a first sampling signal and down sample a first sampling signal into a second sampling signal. The receiver estimates a first sample timing offset (STO) and a first frequency offset (FO) using the first sampling signal and the second sampling signal.

17 Claims, 13 Drawing Sheets

(56) References Cited

U.S. PATENT DOCUMENTS

| | | |
|---|---|---|
| 2014/0293853 A1 | 10/2014 | Cho et al. |
| 2016/0192303 A1* | 6/2016 | Tender ............... H04B 7/18513 370/316 |
| 2016/0242103 A1* | 8/2016 | Mindru ................ H04J 11/0079 |
| 2016/0242130 A1* | 8/2016 | Moon .................... H04B 7/155 |
| 2016/0262123 A1 | 9/2016 | Abedini et al. |
| 2017/0094619 A1* | 3/2017 | Aldana ................. G01S 5/0009 |
| 2017/0227625 A1* | 8/2017 | Markhovsky ........... G01S 1/042 |

* cited by examiner

METHOD AND APPARATUS FOR PRIMARY SYNCHRONIZATION IN INTERNET OF THINGS

CROSS-REFERENCE TO RELATED APPLICATIONS

This application claims priority to and the benefit of Korean Patent Application Nos. 10-2016-0100909 and 10-2017-0099569, filed in the Korean Intellectual Property Office on Aug. 8, 2016 and Aug. 7, 2017, respectively, the entire contents of which are incorporated herein by reference.

BACKGROUND OF THE INVENTION

1. Field of the Invention

The present invention relates to a method and apparatus for primary synchronization in the Internet of things.

2. Description of Related Art

There is a wireless communication system that provides the Internet of things service over a wide area at low power and low cost based on an orthogonal frequency division multiplexing (OFDM) transmission scheme. The wireless communication system supports various modes such as a standalone operating mode, an in-band operating mode, and a guard band operating mode for versatility.

The standalone operating mode is a mode for operating a signal for providing the Internet of things service in a frequency band used in global system for mobile communication (GSM). The in-band operating mode is a mode for operating a signal for providing the Internet of things service to at least one of available resource blocks (RBs) in the frequency band used in the existing long term evolution (LTE) system. Further, the guard band operating mode is a mode for operating a signal for providing the Internet of things service to non-available RBs in a frequency band used in the existing LTE system.

The wireless communication system transmits the same primary synchronization signal every sixth subframe of each frame to acquire time synchronization and frequency synchronization irrespective of the operating modes described above. Describing in more detail, one frame consists of ten subframes and a narrowband primary synchronization signal (NPSS) is transmitted every sixth subframe of each frame. An NPSS frequency domain signal includes a total of 121 samples and values of the samples are fixed. The time synchronization and the frequency synchronization may be acquired by using a time domain conversion signal of the NPSS frequency domain signal.

If a cross-correlation method is generally used to acquire the time synchronization and the frequency synchronization, there is a problem in that battery consumption is increased. On the other hand, the auto-correlation method may reduce the battery consumption but has a problem in synchronization acquisition performance. Due to the problems, the existing method may not be suitable for the wireless communication system for providing the Internet of things service over a wide area for a long time.

SUMMARY OF THE INVENTION

The present invention has been made in an effort to provide a method and an apparatus for primary synchronization capable of effectively acquiring time synchronization and frequency synchronization in the Internet of things.

An exemplary embodiment of the present invention provides a method for acquiring, by a receiver, synchronization in the Internet of things based on a primary synchronization signal received from a transmitter. The method may include: sampling the primary synchronization signal into a digital signal to generate a first sampling signal; down sampling the first sampling signal into a second sampling signal; and estimating a first sample timing offset (STO) and a first frequency offset (FO) using the first sampling signal and the second sampling signal.

The method may further include: filtering the first sampling signal, in which the down sampling may include down sampling the filtered first sampling signal into the second sampling signal.

The first sampling signal may be a 1.92 MHz sampling signal, and the second sampling signal may be a 240 kHz sampling signal.

The estimating may include performing sliding auto-correlation, smoothing correlation, and fine cross-correlation using the first sampling signal and the second sampling signal to estimate the first STO and the first FO.

The estimating may include calculating a second STO and a correlation result value for the second STO by sliding auto-correlation and smoothing correlation.

The calculating may include: performing the sliding auto-correlation using the second sampling signal; performing the smoothing correlation by performing averaging and filtering on temporally adjacent values among values calculated by the sliding auto-correlation; defining a cost function by performing weighted combining on the values calculated by the smoothing correlation; setting an STO value to be the second STO when the cost function is maximum; and setting the cost function value for the second STO to be the correlation result value. The estimating may further include: estimating a fractional frequency offset (FFO) using the correlation result value; and correcting the FFO using the second sampling signal and the FFO.

The estimating may further include performing cross-correlation on the corrected FFO and the second sampling signal to estimate an integer frequency offset (IFO).

The estimating may further include finally estimating the first STO and the FO using the second STO, the FFO, and the IFO.

The finally estimating may further include: performing a first cross-correlation using the second STO, the FFO, the IFO, and the second sampling signal; and performing a second cross-correlation using the result value for the first cross-correlation and the first sampling signal to finally estimate the first STO and the first FO.

Another embodiment of the present invention provides a method for acquiring, by a terminal, synchronization in the Internet of things based on a primary synchronization signal received from a base station. The method may include: sampling the primary synchronization signal into a digital signal to generate a first sampling signal; filtering the first sampling signal; down sampling the filtered first sampling signal into a second sampling signal; and performing sliding auto-correlation and cross-correlation using the first sampling signal and the second sampling signal to estimate a first sample timing offset (STO) and a first frequency offset (FO).

The estimating may include: calculating a second STO and a correlation result value for the second STO by sliding auto-correlation and smoothing correlation; estimating a fractional frequency offset (FFO) using the correlation result value; and correcting the FFO using the second sampling signal and the FFO.

The estimating may include: performing a first cross-correlation on the corrected FFO and the second sampling signal to estimate an integer frequency offset (IFO); performing a second cross-correlation using the second STO, the FFO, the IFO, and the second sampling signal; and performing a third cross-correlation using the result value for the first cross-correlation and the filtered first sampling signal to finally estimate the first STO and the first FO.

Yet another exemplary embodiment of the present invention provides a receiver. The receiver may include: an analog-digital converter sampling a primary synchronization signal received from a transmitter into a digital signal to generate a first sampling signal; a filter unit filtering the first sampling signal; a synchronization decimator down sampling the filtered first sampling signal into a second sampling signal; and a synchronization detector estimating a first sample timing offset (STO) and a first frequency offset (FO) using the first sampling signal and the second sampling signal.

The synchronization detector may perform sliding correlation, smoothing correlation, and fine cross-correlation using the first sampling signal and the second sampling signal to estimate the first STO and the first FO.

The synchronization detector may include: a first processor calculating a second STO and a correlation result value for the second STO by sliding auto-correlation and smoothing correlation; and a second processor estimating a fractional frequency offset (FFO) using the correlation result value and correcting the FFO using the second sampling signal and the FFO.

The synchronization detector may include: a third processor performing a first cross-correlation on the corrected FFO and the second sampling signal to estimate an integer frequency offset (IFO); and a fourth processor performing a second cross-correlation using the second STO, the FFO, the IFO, and the second sampling signal and performing a third cross-correlation using the result value for the first cross-correlation and the filtered first sampling signal to finally estimate the first STO and the first FO.

The first processor may include: a sliding auto-correlator performing the sliding auto-correlation using the second sampling signal and performing the smoothing correlation by performing averaging and filtering on temporally adjacent values among values calculated by the sliding auto-correlation; and a coherent combiner defining a cost function by performing weighted combining on the values calculated by the smoothing correlation, setting the STO value to be as the second STO when the cost function is maximum, and setting the value of the cost function for the second STO as the correlation result value.

The frequency of the first sampling signal may be 8 times as large as that of the second sampling signal.

The receiver may further include a physical layer controller applying the first FO for an automatic frequency control.

According to an exemplary embodiment of the present invention, the coarse auto-correlation method and the fine cross-correlation method are interchangeably used with each other to effectively acquire the time synchronization and the frequency synchronization in the Internet of things over a wide area at low power.

DETAILED DESCRIPTION OF THE EMBODIMENTS

Figure 1:
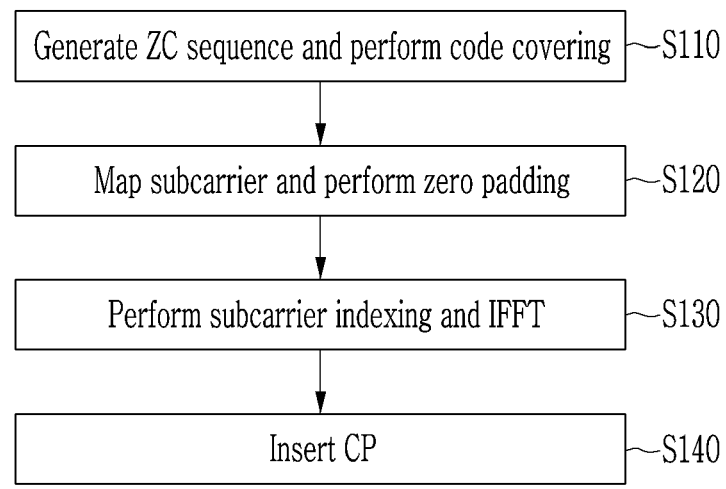
FIG. 1 is a diagram illustrating a method for generating an NPSS signal in a standalone operating mode according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, a receiver may refer to a terminal, a mobile terminal (MT), a mobile station (MS), an advanced mobile station (AMS), a high reliability mobile station (HR-MS), a subscriber station (SS), a portable subscriber station (PSS), an access terminal (AT), user equipment (UE), and the like and may include all or some of functions of the terminal, the MT, the MS, the AMS, the HR-MS, the SS, the PSS, the AT, the UE, and the like Further, a transmitter may refer to a base station(BS), an advanced base station (ABS), a high reliability base station (HR-BS), a nodeB, an evolved node B (eNodeB), an access point (AP), a radio access station (RAS), a base transceiver station (BTS), a mobile multihop relay (MMR)-BS, a relay station (RS) serving as a base station, a high reliability relay station (HR-RS) serving as a base station, and the like and may also include all or some of functions of the BS, the ABS, the HR-BS, the nodeB, the eNodeB, the AP, the RAS, the BTS, the MMR-BS, the RS, the HR-RS, and the like.

A method for generating a narrowband primary synchronization signal (NPSS) frequency domain signal according to an exemplary embodiment of the present invention will be described.

In a standalone operating mode, the generation of the NPSS frequency domain signal will be described first of all.

Referring to the following Equation 1, the NPSS frequency domain signal ($p_m(n)$) may consist of a combination of length-11 Zadoff Chu (ZC) sequence having root index 5 and code cover $S_m$.

$$p_m(n) = S_m \exp\left(\frac{-j5\pi n(n+1)}{11}\right), n = 0, 1, \ldots, 10 \quad \text{Equation 1}$$

$$S_{[0:10]} = [1\,1\,1\,1\,-1\,-1\,1\,1\,1\,-1\,1]$$

In the above Equation 1, m means an OFDM symbol index allocated for narrowband-Internet of things (NB-IoT), in which m=0, 1, 2, . . . , 10. n means a logical subcarrier index of a physical resource block (RB) occupied by the NPSS. In the above Equation 1, the code cover $S_m$ is applied to a frequency domain. Meanwhile, the code cover $S_m$ has a single value irrespective of the subcarrier index, and the code cover $S_m$ may be multiplied by a code cover $S_m$ corresponding to each time domain OFDM symbol because only the corresponding band of the physical RB is filtered by the NB-IoT terminal to perform a demodulation process.

FIG. 1 is a diagram illustrating a method for generating an NPSS signal in a standalone operating mode according to an exemplary embodiment of the present invention.

First, the transmitter generates the length-11 ZC sequence having the root index 5 as the above Equation 1 and performs code covering (S110). That is, the transmitter generates eleven NPSS frequency domain signals every m as the above Equation 1.

The transmitter performs subcarrier mapping and zero padding (S120). That is, the transmitter allocates the generated sequence element to corresponding subcarrier locations {k, n} and symbol m and then performs the zero padding to generate a total of 128 samples. In detail, a physical subcarrier location k=−64, −63, −62, . . . , −1, 0, 1, . . . , 62, 63, a logical subcarrier location n=0, 1, . . . ,10, subcarrier locations to which the sequence element is allocated are {−6,0}, {−5,1}, {−4,2}, . . . , {−1,5},{0,6}, . . . , {5, 11}, and the rest physical subcarrier locations k (=−64, −63, . . . , −7, 6, 7, . . . , 63) suffer from the zero padding. The process is repeatedly performed every symbol m.

Next, the transmitter performs subcarrier indexing and inverse fast Fourier transform (IFFT) (S130). That is, the transmitter performs the subcarrier indexing process of performing cyclic shifting to the left by 64 and then performs 128-point IFFT. The subcarrier indexing process may be performed by a location exchange between an upper subcarrier group (corresponding to 64 subcarriers) and a lower subcarrier group (corresponding to 64 subcarriers).

The transmitter inserts a cyclic prefix (CP) (S140). When the CP is inserted, if m=4, a CP length is 10 and the rest CP length may be 9.

As illustrated in FIG. 1, when the receiver samples the NPSS signal at 1.92 MHz, the number of samples of the NPSS time domain signal may be 1508 (=138+137*10).

Figure 2:
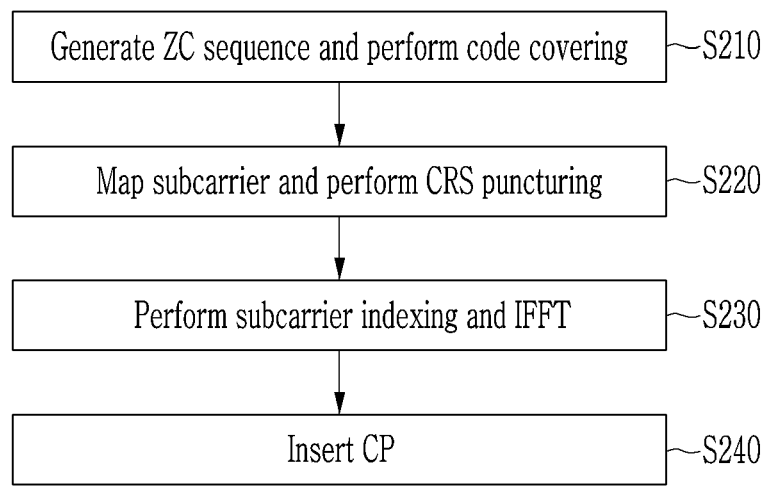
FIG. 2 is a diagram illustrating a method for generating an NPSS signal in an in-band operating mode according to an exemplary embodiment of the present invention.

FIG. 2 is a diagram illustrating a method for generating an NPSS signal in an in-band operating mode according to an exemplary embodiment of the present invention.

In the in-band operating mode, the NPSS frequency domain signal ($p_m(n)$) is the same as the above Equation 1. However, unlike the standalone operating mode, the synchronization signal is transmitted through a specific RB in the in-band operating mode, such that the code covering may be performed only in the frequency domain as the above Equation 1.

First, the transmitter generates the length-11 ZC sequence having the root index 5 as the above Equation 1 and performs code covering (S210). That is, the transmitter generates eleven NPSS frequency domain signals every m as the above Equation 1.

The transmitter performs subcarrier mapping and cell-specific reference signal (CRS) puncturing (S220). The transmitter allocates the generated sequence element to the corresponding subcarrier locations {k, n} and the symbol m of the specific physical RB in the in-band of the legacy LTE and then performs the zero padding, thereby generating a total of 128 samples. That is, the transmitter allocates an m-th sequence element to eleven subcarrier locations every m and performs 117 zero paddings. Further, the transmitter performs the puncturing at the subcarrier location, to which the legacy CRS is allocated, not to affect the legacy LTE system.

Next, the transmitter performs the subcarrier indexing and the IFFT according to a bandwidth (BW) of the legacy LTE system (S230). The transmitter inserts the CP (S240). Here, the subcarrier indexing process may be performed by the location exchange between the upper subcarrier group (the number of subcarriers corresponding to BW of the upper half of the LTE system BW) and the lower subcarrier group (the number of subcarriers corresponding to BW of the lower half of the LTE system BW).

Accordingly, if the receiver (i.e., NB-IoT UE) tunes RF on the physical RB on which the NPSS is carried to perform ADC sampling at 1.92 MHz, the number of samples of the NPSS time domain signal may be 1508 (=138+137*10) like the standalone operating mode.

Meanwhile, the method for generating a synchronization signal in the guard band operating mode is the same as the in-band operating mode except that the physical RB location is in the guard band and the CRS puncturing is not required.

Hereinafter, a method and an apparatus for acquiring time synchronization and frequency synchronization based on an NPSS signal described above will be described.

Figure 3:
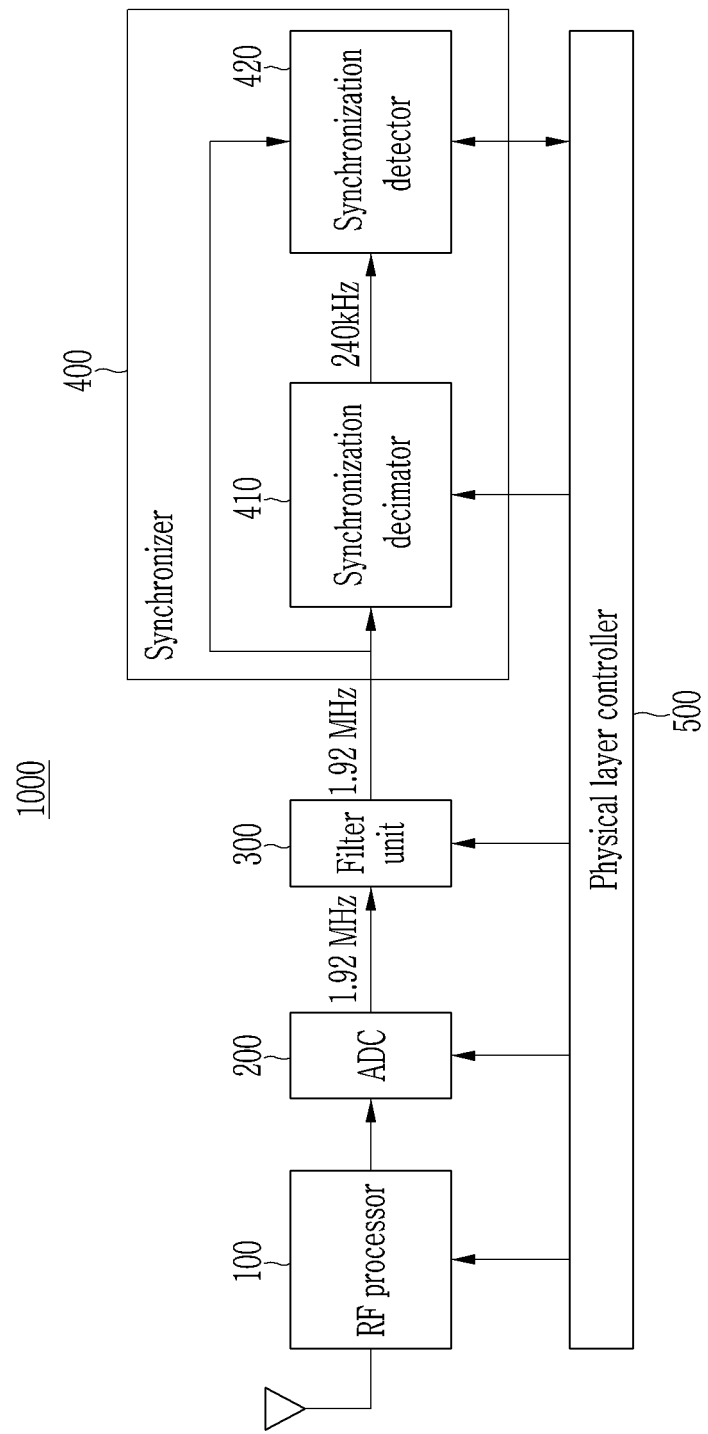
FIG. 3 is a block diagram illustrating a receiver according to an exemplary embodiment of the present invention.

FIG. 3 is a block diagram illustrating a receiver 1000 according to an exemplary embodiment of the present invention.

As illustrated in FIG. 3, the receiver 1000 according to the exemplary embodiment of the present invention includes an RF processor 100, an analog-digital converter (ADC) 200, a filter unit 300, a synchronizer 400, and a physical layer controller 500.

The RF processor 100 performs RF signal processing on an NPSS signal received from the transmitter. The RF signal processing may include a function of amplifying a signal while removing noise, an automatic frequency control (AFC) function, and a bandpass filtering function for an RB band on which the NPSS signal is carried.

The ADC 200 samples an analog signal into a digital signal at a predetermined sampling rate. Most of the bandwidths occupied by an NB-IoT transmission signal are 180 kHz, and therefore the sampling rate may be 1.92 MHz by Nyquist sampling theorem.

The filter unit 300 performs baseband filtering on the signal that is sampled at 1.92 MHz by the ADC 200 and input. The bandwidth occupied by the NB-IoT transmission signal is 180 kHz, and therefore the filter unit 300 may be implemented as a low pass filter (LPF) having a 180 kHz bandwidth. That is, the filter unit 300 just needs to filter only the physical RB on which the NPSS signal is carried irrespective of the system BW of the transmitter (for example, the base station), and therefore may have a 180 kHz bandwidth.

The synchronizer 400 receives a 1.92 MHz sampling signal filtered by the physical RB, on which the NPSS signal is carried, from the filter unit 300, and uses the received sampling signal to perform the time synchronization and the frequency synchronization.

The physical layer controller 500 controls the RF processor 100, the ADC 200, the filter unit 300, and the synchronizer 400. That is, the physical layer controller 500 controls the overall operation of a physical layer L1. In the following description, the physical layer controller 500 may be interchangeably used with term 'L1 control'.

As illustrated in FIG. 3, the synchronizer 400 according to the exemplary embodiment of the present invention includes a synchronization decimator 410 and a synchronization detector 420. In the following description, the synchronization decimator 410 may be interchangeably used with term 'SYNC Decimator', and the synchronization detector 420 may be interchangeably used with term 'NPSS Detector'.

The synchronization decimator 410 performs down-sampling from a signal sampled at 1.92 MHz to 240 kHz.

The synchronization detector 420 estimates and corrects a sample timing offset (STO) index and a frequency offset (FO) value based on the NPSS signal transmitted from the transmitter (base station) in units of 10 ms. The synchronization detector 420 transmits the estimated STO index and FO value to the physical layer controller 500. Here, the physical layer controller 500 controls the RF processor 100 to apply the estimated FO value to the automatic frequency control (AFC) function.

The synchronization decimator 410 performs decimation when receiving an enable signal from the physical layer controller 500. That is, the synchronization decimator 410 performs 8-times down sampling on the input signal suffering from 180 kHz BIN filtering to generate a sampling signal of 240 kHz which is input to the synchronization detector 420.

The synchronization detector 420 performs NPSS detection when receiving the enable signal from the physical layer controller 500. The synchronization detector 420 performs sliding correlation, smoothing correlation, and fine cross-correlation on the 240 kHz sampling signal. Finally, the synchronization detector 420 again performs the fine cross-correlation between the 1.92 MHz sampling signal and an NPSS time domain standard signal. The synchronization detector 420 uses the largest one correlation result value obtained by the process to calculate an STO estimate and an FO estimate. The synchronization detector 420 transmits the STO estimate and the FO estimate to the physical layer controller 500 and is then disabled.

Parameters associated with a functional interface of the synchronizer 400 are as the following Tables 1 to 3.

The following Table 1 shows an input signal for the functional interface of the synchronizer 400.

TABLE 1

| Signal Name | Signal Description | Signal Characteristics | | | Source |
|---|---|---|---|---|---|
| | | Type | Size | Rate | |
| i_Start_SyncDecimator | SYNC Decimator enable strobe | int | [1] | Radio-frame | L1 Control |
| i_Start_NPSS | NPSS detector enable strobe | int | [1] | Radio-frame | L1 Control |
| i_NumAcc_NPSS | Per-10 ms NPSS subframe symbol accumulation num in NPSS detector | int | [1] | Radio-frame | L1 Control |
| i_ThdStep1_NPSS | Threshold of Step1 in NPSS detector | double | [1] | Radio-frame | L1 Control |
| i_ThdStep3_NPSS | Threshold of Step3 in NPSS detector | double | [1] | Radio-frame | L1 Control |
| in1920 | Input signal of 180-kHz BW Filter | dcomplx | [1] | Sampling Rate | 180-kHz BW Filter (Front End Interface) |

The following Table 2 shows an output signal for the functional interface of the synchronizer 400.

TABLE 2

| Signal Name | Signal Description | Signal Characteristics | | | Destination |
|---|---|---|---|---|---|
| | | Type | Size | Rate | |
| o_STO | STO from NPSS detector | int | [1] | Radio-frame | L1 Control |
| o_FO | FO from NPSS detector | double | [1] | Radio-frame | L1 Control |
| o_Done_NPSS | NPSS detector done strobe | int | [1] | Radio-frame | L1 Control |

The following Table 3 shows parameters of the synchronizer 400.

TABLE 3

| Parameters | Value |
|---|---|
| FFT Size | 16: FFT |
| Subcarrier spacing | 15 kHz |
| # used subcarriers | 11 (NPSS) |
| Sampling Rate | 1.92 MHz: ADC, NPSS Detector<br>240 kHz: NPSS Detector |
| CP Length | Normal CP (1.92 MHz): 10 (1$^{st}$ OFDM symbol every slot), 9(Last 6 OFDM symbols every slot) |

Figure 4:
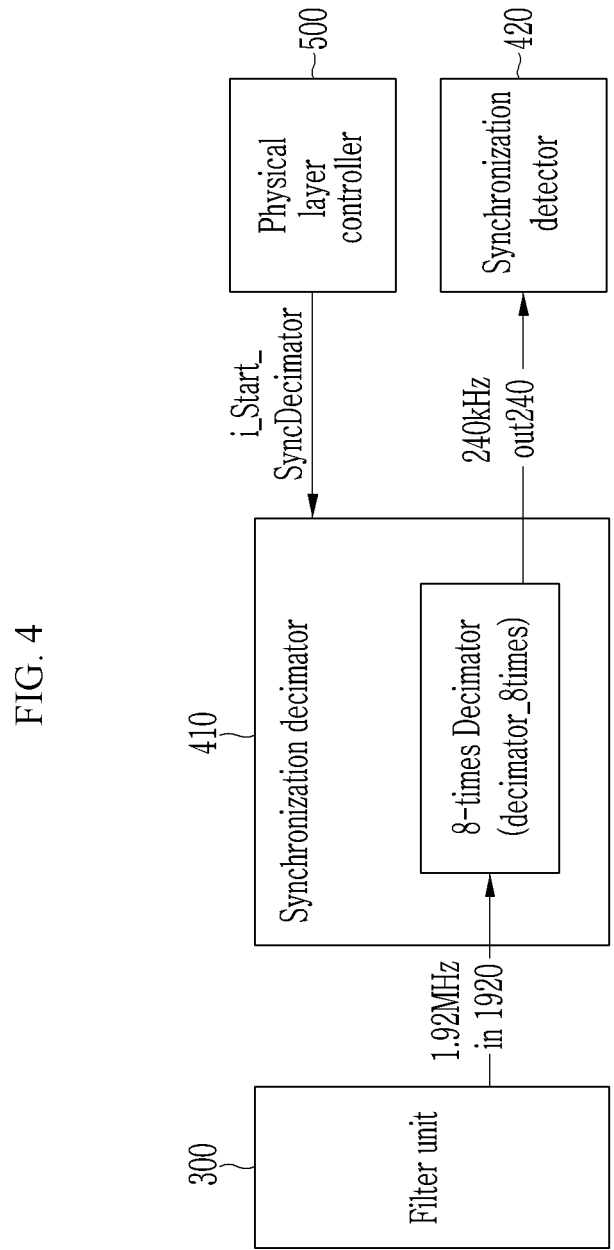
FIG. 4 is a block diagram illustrating a synchronization decimator according to an exemplary embodiment of the present invention.

FIG. 4 is a block diagram illustrating the synchronization decimator 410 according to the exemplary embodiment of the present invention. Describing in more detail, FIG. 4 is a diagram illustrating a relationship between the synchronization decimator 410 and adjacent apparatuses.

The synchronization decimator 410 performs the 8-times down sampling on the sampling signal that suffers from the 180 kHz BW filtering by the filter unit 300, and is performed when receiving i_Start_SyncDecimator=ON from the physical layer controller 500. Here, the reason why the synchronization decimator 410 performs the 8-times down sampling is to reduce complexity of the NPSS detection. The synchronization decimator 410 may be configured as 8-times down-sampler.

As illustrated in the above Table 3, a down link subcarrier spacing of the NB-IoT is 15 kHz, and therefore when the sampling is performed at 1.92 MHz, the number of samples of a time domain effective OFDM symbol becomes 128. For this, when the down sampling is performed at 240 kHz, a total number of samples becomes 16. However, in the OFDM transmission scheme, the CP is added, and therefore the number of samples considering the added CP becomes 138 because a first OFDM symbol of each slot includes the CP and other OFDM symbols become 137. Accordingly, an integer multiple relationship between the number of samples within one OFDM symbol and the number of samples when the down sampling is performed at 240 kHz is not established. Even if the timing mismatch occurs, the exact accumulation of correlation result values estimated every 10 ms needs to be performed. Accordingly, as illustrated in FIG. 5, the synchronization decimator 410 catches one sample every eight samples to obtain a sample of 240 kHz.

Figure 5:
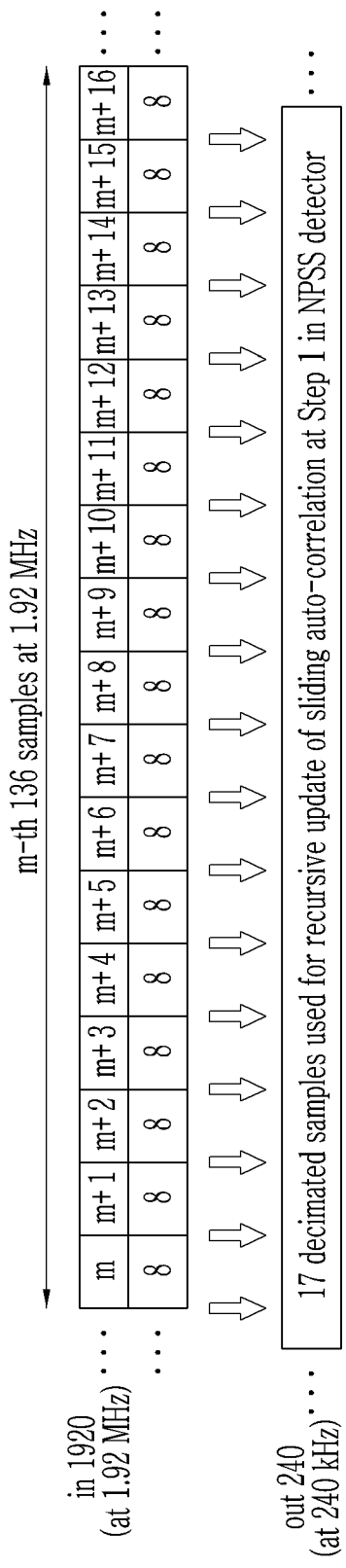
FIG. 5 is a diagram illustrating a method for down sampling of a synchronization decimator according to an exemplary embodiment of the present invention.

FIG. 5 is a diagram illustrating a method for down sampling of a synchronization decimator 410 according to an exemplary embodiment of the present invention.

As illustrated in FIG. 5, the synchronization decimator 410 catches one sample every eight samples to obtain a sample of 240 kHz. Describing in more detail, when the sampling is performed at 1.92 MHz, a total number of samples is 19200 within 10 ms, and when the sampling is performed at 240 kHz, a total number of samples within 10 ms is 2400. That is, 2400 samples in total are equal to the number obtained upon the 8-times down sampling of 19200. Accordingly, the synchronization decimator 410 may use 10 ms as a time window to perform the accumulation every 10 ms.

The following Table 4 shows an input signal for the functional interface of the synchronization decimator 410.

TABLE 4

| Signal Name | Signal Description | Signal Characteristics | | | Source |
| --- | --- | --- | --- | --- | --- |
| | | Type | Size | Rate | |
| i_Start_SyncDecimator | SYNC Decimator enable strobe | int | [1] | Radio-frame | L1 Control |
| in1920 | 180-kHz BW Filtered signal | dcomplx | [1] | Sampling Rate (1.92 MHz) | 180-kHz BW Filter |

The following Table 5 shows an output signal for the functional interface of the synchronization decimator 410.

TABLE 5

| Signal Name | Signal Description | Signal Characteristics | | | Destination |
| --- | --- | --- | --- | --- | --- |
| | | Type | Size | Rate | |
| out240 | 8-times down-sampled output signal | dcomplx | [1] | Sampling rate (240 kHz) | NPSS Detector |

Figure 6:
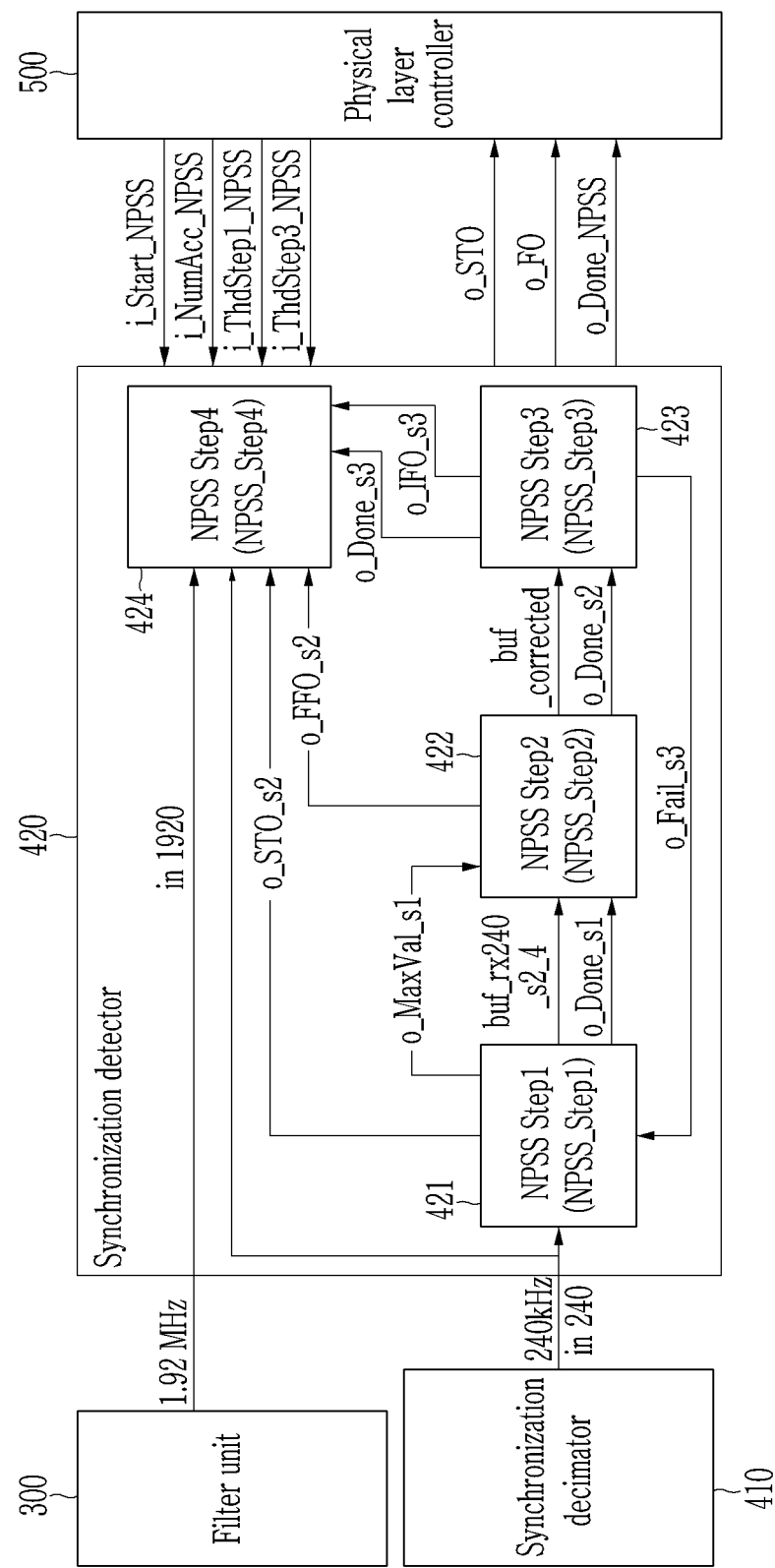
FIG. 6 is a block diagram illustrating the synchronization detector according to an exemplary embodiment of the present invention.
Figure 7:
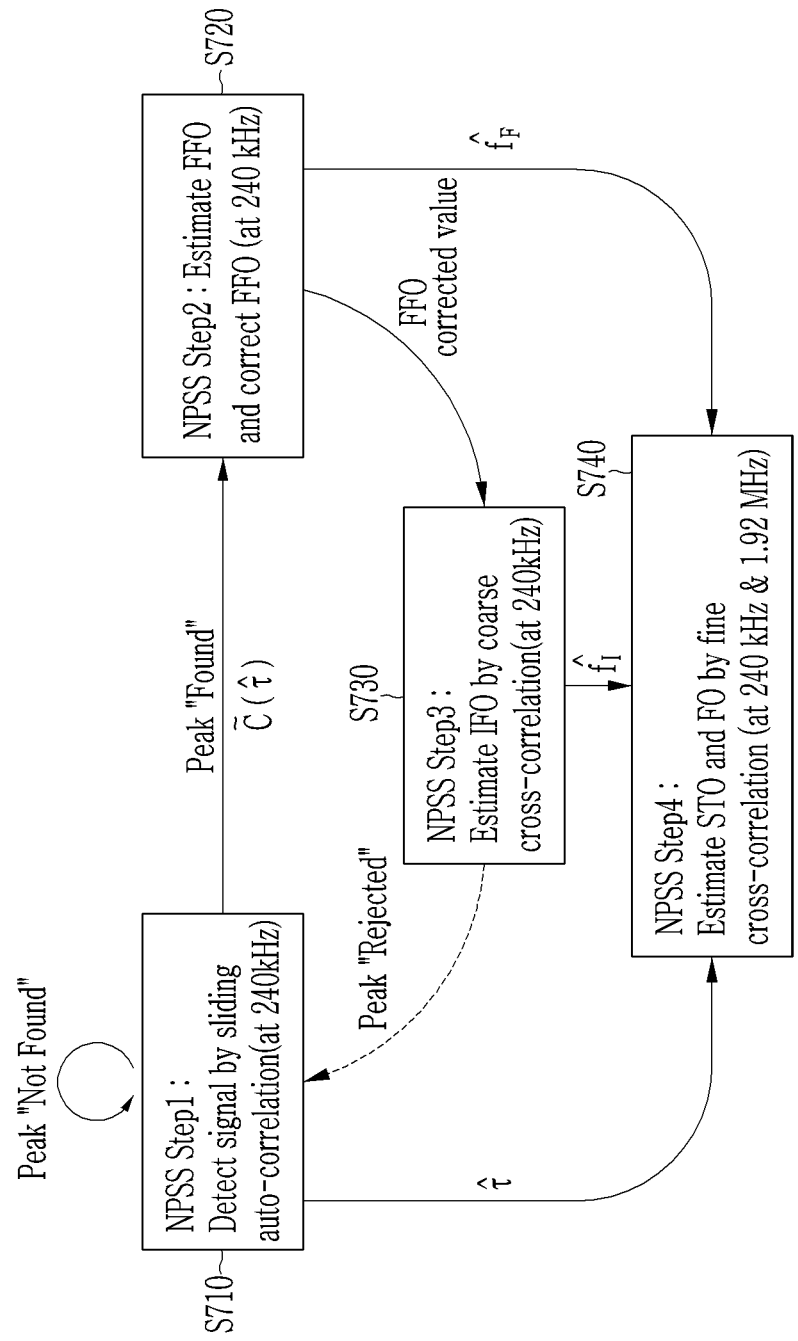
FIG. 7 is a state transition diagram of the synchronization detector according to the exemplary embodiment of the present invention.

FIG. 6 is a block diagram illustrating the synchronization detector 420 according to the exemplary embodiment of the present invention. FIG. 7 is a diagram illustrating a state transition diagram of the synchronization detector 420 according to the exemplary embodiment of the present invention.

As illustrated in FIG. 6, the synchronization detector 420 according to the exemplary embodiment of the present invention includes a first processor 421, a second processor 422, a third processor 423, and a fourth processor 424. The first processor 421 may be interchangeably used with term 'NPSS Step1', and the second processor 422 may be interchangeably used with term 'NPSS Step2'. The third processor 423 may be interchangeably used with term 'NPSS Step3', and the fourth processor 424 may be interchangeably used with term 'NPSS Step4'.

The synchronization detector 420 uses the NPSS time domain signal transmitted in a sixth subframe of each frame to acquire the time synchronization and the frequency synchronization. The synchronization detector 420 is operated by receiving i_Start_NPSS=ON as an enable signal from the physical layer controller 500.

The first processor (NSS Step1, 421) uses characteristics of the NPSS time domain standard signal to perform sliding auto-correlation, smoothing correlation, and coherent combining and accumulation on the signal sampled at 240 kHz (S710).

The first processor 421 calculates the largest correlation result value o_MaxVal_s1 obtained by the sliding auto-correlation and an STO value o_STO_s1 at that time. When the o_MaxVal_s1 is higher than a threshold i_ThdStep1_NPSS received from the physical layer controller 500, the first processor 421 transmits the o_STO_s1 ($\hat{\tau}$ described below) to the fourth processor 424. At this point, the first processor 421 transmits samples (buf_rx240_s2_4) and o_Done_s1=ON corresponding to the NPSS time domain standard signal along with the o_MaxVal_s1 to the second processor 422 at timing before arid after the o_STO_s1.

When the o_MaxVal_s1 is lower than a threshold (i_ThdStep1_NPSS) received from the physical layer controller 500, the first processor 421 is maintained in the o_Done_s1=OFF state and repeats the step S710. When receiving o_Fail_s3=ON from the third processor 423, the first processor 421 repeats the step S710.

The second processor (NPSS Step2, 422) uses the o_MaxVal_s1 received from first processor 421 to estimate fractional FFO (FFO) (S720). The second processor 422 uses the estimated FFO to perform the FO correction on samples bug_rx240_s2_4 received from the first processor 421 (S720). The second processor 422 transmits an FFA value (o_FFO_s2) estimated by the processes to the fourth processor 424, and an FFO corrected value (buf_corrected) to the third processor 423.

The third processor (NPSS Step3, 423) performs coarse cross-correlation on the corrected FFO corrected value (buf_corrected) received from the second processor 422 to estimate an integer FO (IFO) value o_IFO_s3 (S730). When the largest coarse cross-correlation result value o_IFO_s3 ($\hat{f}_I$) estimated by the coarse cross-correlation is higher than a threshold i_ThdStep3_NPSS received from the physical layer controller 500, the third processor 423 transmits the estimated o_IFO_s3 ($\hat{f}_I$) to the fourth processor 424. However, when the largest coarse cross-correlation result value o_IFO_s3 ($\hat{f}_I$) estimated by the coarse cross-correlation is lower than a threshold i_ThdStep3_NPSS received from the physical layer controller 500, the third processor 423 transmits o_Fail_s3=ON to the first processor 421.

The fourth processor (NPSS Step4, 424) uses o_FFO_s2 ($\hat{f}_F$) and o_IFO_s3 ($\hat{f}_I$) (i.e., FO=o_IFO_s3+o_FFO_s2) to perform the fine cross-correlation on the samples of 240 kHz corresponding to the NPSS time domain signal of the synchronization decimator 410 input after one frame in o_STO_s1($\hat{\tau}$) received from the first processor 241 (S740). By doing so the fourth processor 424 primarily estimates the STO value and the FO value. Further, the fourth processor 424 uses the primarily estimated STO value and FO value to again perform the fine cross-correlation on the samples of 1.92 MHz corresponding to the NPSS time domain signal of the filter unit 300, thereby estimating the final STO value and FO value (S740). The fourth processor 424 transmits the finally estimated STO value o_STO and FO value o_FO to the physical layer controller 500.

The physical layer controller 500 applies the o_FO value received from the fourth processor 424 to the automatic frequency control (AFC) function.

The following Table 6 shows the input signal for the functional interface of the synchronization detector 420.

TABLE 6

| Signal Name | Signal Description | Signal Characteristics | | | Source |
|---|---|---|---|---|---|
| | | Type | Size | Rate | |
| i_Start_NPSS | NPSS Detector enable strobe | int | [1] | Radio-frame | L1 Control |
| i_NumAcc | Per-10 ms NPSS subframe symbol accumulation num in NPSS detector | int | [1] | Radio-frame | L1 Control |
| i_ThdStep1_NPSS | NPSS Step1 Threshold | double | [1] | Radio-frame | L1 Control |
| i_ThdStep3_NPSS | NPSS Step3 Threshold | double | [1] | Radio-frame | L1 Control |
| in1920 | Filtered 1.92 MHz-sampled signal | dcomplx | [1] | Sampling Rate | 180-kHz BW Filter |
| in240 | Filtered 240 kHz-sampled signal | dcomplx | [1] | Sampling Rate | SYNC Decimator |

The following Table 7 shows the output signal for the functional interface of the synchronization detector 420.

TABLE 7

| Signal Name | Signal Description | Signal Characteristics | | | Destination |
|---|---|---|---|---|---|
| | | Type | Size | Rate | |
| o_STO | Sample timing offset | int | [1] | Radio-fame | L1 Control |
| o_FO | Frequency offset | double | [1] | Radio-frame | L1 Control |
| o_Done_NPSS | NPSS Detector finish strobe | int | [1] | Radio-frame | L1 Control |

Figure 8:
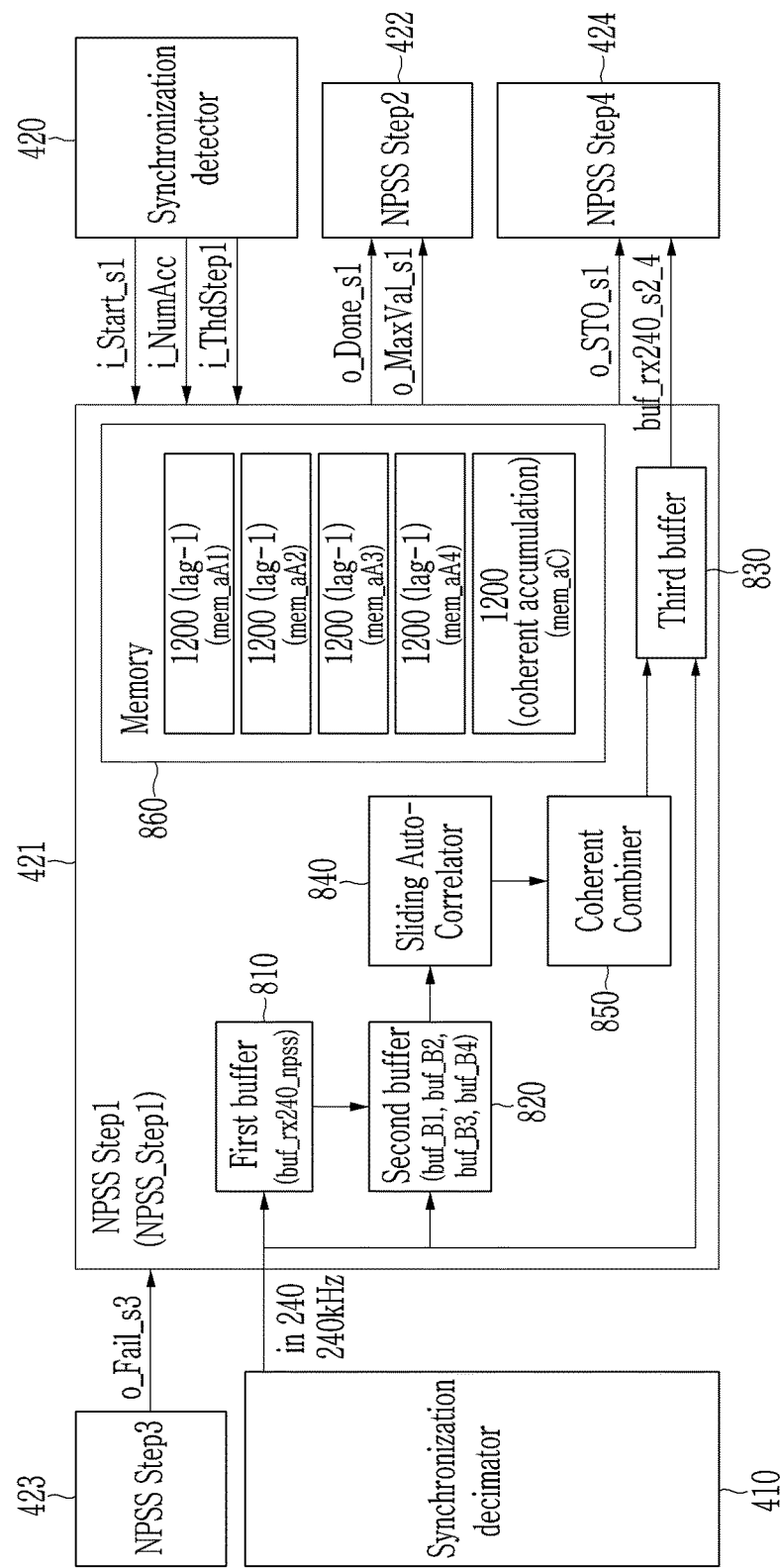
FIG. 8 is a block diagram illustrating a first processor according to an exemplary embodiment of the present invention.

FIG. 8 is a block diagram illustrating the first processor 421 according to the exemplary embodiment of the present invention.

As illustrated in FIG. 8, the first processor 421 according to the exemplary embodiment of the present invention includes first to third buffers 810, 820, and 830, a sliding auto-correlator 840, a coherent combiner 850, and a memory 860. The first processor 421 is performed when o_Fail_s3=ON is transmitted from the third processor 423 or in the case of i_Start_s1=ON.

As described above, the NPPSS is transmitted every sixth subframe of each frame. That is, there is a subframe corresponding to one NPSS time domain standard signal within 10 ms. In view of this, a window size of the first processor 421 according to the exemplary embodiment of the present invention may be set to be 10 ms. Meanwhile, in a specific sample time instant τ(=mod(t, 2400), t=0, 1, 2, . . . , 2400, . . . ), a N×1 received sample vector corresponding to an OFDM symbol m is defined as the following Equation 2.

$$y_m(\tau)=[y(mN+\tau)y(mN+1+\tau) \ldots y((m+1)N-1+\tau)],$$
$$0 \leq \tau < 2400 \quad m=0, 1, \ldots, 10 \quad \text{Equation 2}$$

According to the exemplary embodiment of the present invention, assume that N=17. According to the above Equation 2, a vector representation for samples corresponding to the NPSS time domain standard, signal is $$[y_0(\tau) \; y_1(\tau) \ldots y_{10}(\tau)]$$

The sliding auto-correlator 840 applies the code cover $\{S_m\}$ described in the above Equation 1 to $\{y_m\}$ and then calculates a sum of conjugated inner products of a pair of lag-k sub-vectors, that is, $S_m y_m$ and $S_{m+k} y_{m+k}$, that is, the sliding auto-correlation. The auto-correlation $A_k(\tau)$ is represented by the following Equation 3.

$$A_k(\tau) = \frac{1}{11-k} \sum_{m=0}^{10-k} S_m S_{m+k} y_{m+k}(\tau) y_m^H(\tau), \quad \text{Equation 3}$$

$$k = 1, 2, 3, 4,\ 0 \le \tau < 2400$$

where $S_{[0:10]} = [1\,1\,1\,1\,-1\,-1\,1\,1\,1\,-1\,-1]$

Referring to FIG. 3, the first buffer 810 buffers the number of samples corresponding to eleven OFDM symbols, that is, 11N samples (buf_rx240_npss[0-186]).

In the above Equation 3, an inner product between $y_m^H$ and $y_{m+k}$ is as the following Equation 4.

$$\begin{aligned} y_{m+k}(\tau) y_m^H(\tau) &= \sum_{g=0}^{N-1} y((m+k)N + g + \tau) y^*(mN + g + \tau) \\ &= y_{m+k}(\tau-1) y_m^H(\tau-1) + B_{m+1,k}(\tau) - B_{m,k}(\tau), \end{aligned} \quad \text{Equation 4}$$

where $$B_{m+1,k}(\tau) = y((m+1+k)N - 1 + \tau) y^*((m+1)N - 1 + \tau)$$

$$B_{m,k}(\tau) = y((m+k)N - 1 + \tau) y^*(mN - 1 + \tau).$$

The sliding auto-correlation Equations for each lag-k may be arranged by substituting the above Equation 4 into the above Equation 3 to obtain the following Equations 5 to 8.

$$\begin{aligned} A_1(\tau) &= \frac{1}{10} \sum_{m=0}^{9} S_m S_{m+1}(y_{m+k}(\tau-1) y_m^H(\tau-1) + B_{m+1,1}(\tau) - B_{m,1}(\tau)) \\ &= A_1(\tau-1) + \frac{1}{10} \sum_{m=0}^{9} S_m S_{m+1}(B_{m+1,1}(\tau) - B_{m,1}(\tau)) \\ &= A_1(\tau-1) - \frac{1}{5}\Big(\frac{1}{2} B_{0,1}(\tau) - B_{3,1}(\tau) + B_{4,1}(\tau) - B_{5,1}(\tau) + \\ &\quad B_{6,1}(\tau) - B_{8,1}(\tau) + \frac{1}{2} B_{10,1}(\tau)\Big) \end{aligned} \quad \text{Equation 5}$$

$$\begin{aligned} A_2(\tau) &= \frac{1}{9} \sum_{m=0}^{8} S_m S_{m+2}(y_{m+2}(\tau-1) y_m^H(\tau-1) + B_{m+1,2}(\tau) - B_{m,2}(\tau)) \\ &= A_2(\tau-1) + \frac{1}{9} \sum_{m=0}^{8} S_m S_{m+2}(B_{m+1,2}(\tau) - B_{m,2}(\tau)) \\ &= A_2(\tau-1) - \frac{2}{9}\Big(\frac{1}{2} B_{0,2}(\tau) - B_{2,2}(\tau) + B_{6,2}(\tau) - B_{7,2}(\tau) + \\ &\quad B_{8,2}(\tau) - \frac{1}{2} B_{9,2}(\tau)\Big) \end{aligned} \quad \text{Equation 6}$$

$$\begin{aligned} A_3(\tau) &= \frac{1}{8} \sum_{m=0}^{7} S_m S_{m+3}(y_{m+3}(\tau-1) y_m^H(\tau-1) + B_{m+1,3}(\tau) - B_{m,3}(\tau)) \\ &= A_3(\tau-1) + \frac{1}{8} \sum_{m=0}^{7} S_m S_{m+3}(B_{m+1,3}(\tau) - B_{m,3}(\tau)) \\ &= A_3(\tau-1) - \frac{1}{4}\Big(\frac{1}{2} B_{0,3}(\tau) - B_{1,3}(\tau) + B_{3,3}(\tau) - B_{4,3}(\tau) + \\ &\quad B_{7,3}(\tau) - \frac{1}{2} B_{8,3}(\tau)\Big) \end{aligned} \quad \text{Equation 7}$$

$$\begin{aligned} A_4(\tau) &= \frac{1}{7} \sum_{m=0}^{6} S_m S_{m+4}(y_{m+4}(\tau-1) y_m^H(\tau-1) + B_{m+1,4}(\tau) - B_{m,4}(\tau)) \\ &= A_4(\tau-1) + \frac{1}{7} \sum_{m=0}^{6} S_m S_{m+4}(B_{m+1,4}(\tau) - B_{m,4}(\tau)) \\ &= A_4(\tau-1) + \frac{2}{7}\Big(\frac{1}{2} B_{0,4}(\tau) - B_{2,4}(\tau) + B_{4,4}(\tau) - \\ &\quad B_{5,4}(\tau) + \frac{1}{2} B_{7,4}(\tau)\Big) \end{aligned} \quad \text{Equation 8}$$

As can be appreciated from the above Equations 4 to 8, the current sliding auto-correlation value ($A_k(\tau)$) is obtained by adding the just previous sliding auto-correlation value ($A_k(\tau-1)$) to a linear combination of a product of code cover values and $B_{m+1,k}(\tau) - B_{m,k}(\tau)$. However, initially, a process of buffering received samples while calculating the received samples is required.

When the first processor 421 receives the i_Start_s1=ON, which is the enable signal, from the synchronization detector 420 or receives the o_Fail_s3=ON, which is the enable signal, from the third processor 423, the first buffer 810 buffers up to 11N received samples in buf_rx240_npss. At this time, the second buffer 820 buffers $B_{m,k}$ shown in the above Equation 4 for each lag as follows and buffers it. For Lag-1, the second buffer 820 calculates $B_{m,1}[\tau]$, $\tau=0, 1, \ldots 17\times10-1$ and buffers (buf_B1) it. For Lag-2, the second buffer 820 calculates $B_{m,2}[\tau]$, $\tau=0, 1, \ldots 17\times9-1$ and buffers (buf_B2) it. For Lag-3 the second buffer 820 calculates $B_{m,3}[\tau]$, $\tau=0, 1, \ldots 17\times8-1$ and buffers (buf_B3) it. For Lag-4, the second buffer 820 calculates $B_{m,4}[\tau]$, $\tau=0, 1, \ldots, 17\times7-1$ and buffers (buf_B4) it. If 11N sample timing elapses from timing when the first processor 421 receives the i_Start_s1=ON, which is the enable signal, from the synchronization detector 420 or the o_Fail_s3=ON, which is the enable signal, from the third processor 423, the first processor 421 performs the above Equations 4 to 8 while updating the first buffer 810 and the second buffer 820 to acquire the sliding, auto-correlation value.

Figure 9:
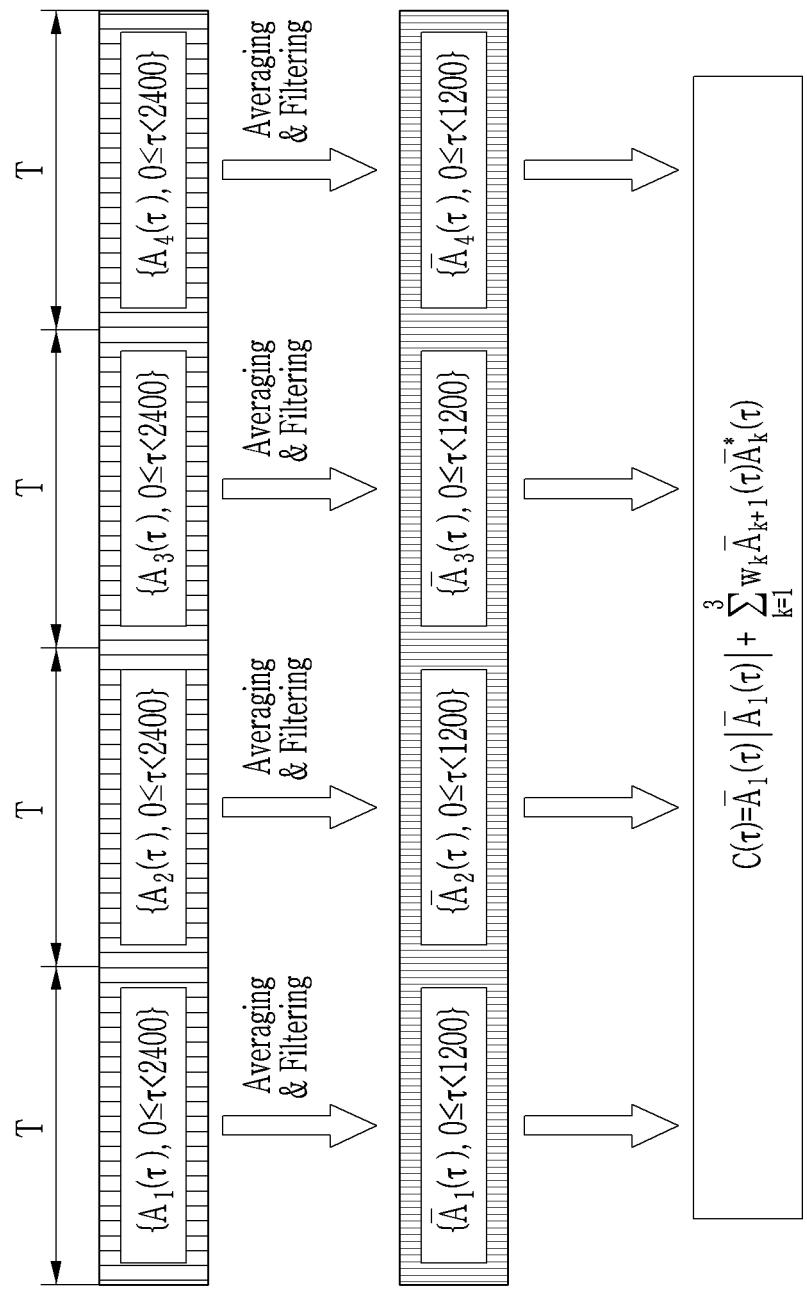
FIG. 9 is a diagram illustrating a smoothing process of the first processor according to the exemplary embodiment of the present invention.

Meanwhile, to improve reliability of the NPSS detection at the low sampling rate like 240 kHz and reduce memory requirement, the first processor 421 perform the following smoothing process, FIG. 9 is a diagram illustrating the smoothing process of the first receiver 421 according to the exemplary embodiment of the present invention.

As illustrated in FIG. 9, the first processor 421 sums two adjacent sliding auto-correlation values and stores a sum thereof in the memory 860. By a recursive update every 10 ms (T=2400) of each time window size, the sliding auto-correlation value $A_k(\tau)$ is acquired. Averaging and infinite impulse response (IIR) filtering may be performed on the sliding auto-correlation values to define a smoothed auto-correlation Equation like the following Equation 9.

$$\overline{A}_k(\tau)=0.9\overline{A}_k(\tau-T)+0.1\{A_k(2\tau-1)+A_k(2\tau)\},\ 0\le\tau<1200,$$
$$k=1,2,3,4 \qquad \text{Equation 9}$$

In the above Equation 9, $\overline{A}_k(\tau-T)$ is the smoothed auto-correlation value stored in the previous time window. By the smoothed auto-correlation, $\overline{A}_k(\tau)$ is the number corresponding to a half of $A_k(\tau)$ (i.e., 1200 for each time window is required).

The coherent combiner defines one cost function to estimate the coarse sampling timing offset of the NPSS signal. The cost function is $C(\tau)$ is weighted combining of $\overline{A}_k(\tau)$ and may be defined as the following Equation 10.

$$C(\tau) = \overline{A}_1(\tau)|\overline{A}_1(\tau)| + \sum_{k=1}^{3} w_k \overline{A}_{k+1}(\tau)\overline{A}_k^*(\tau) \qquad \text{Equation 10}$$

In the above Equation 10, a weighted value may be set to be $w_1=0.76$, $w_2=0.54$, $w_3=0.34$. In the NB-IoT system, the receiver (terminal) requires low cost and extended coverage, and the receiver (terminal) endures low SNR (for example, −12.6 dB) and low-speed fading (doppler frequency=1 Hz). To secure cell searching even in the poor environment, the NPSS signal is transmitted every 10 ms. Accordingly, a receiver 1000 according to an exemplary embodiment of the present invention performs an accumulation-based searcher algorithm to strengthen a diversity gain. Based on the algorithm, a filtered cost function of the cost function is as the following Equation 11.

$$\tilde{C}(\tau)=\alpha\tilde{C}(\tau-T)+(1-\alpha)C(\tau),\ 0.5<\alpha<1 \qquad \text{Equation 11}$$

In the above Equation 11, α is a decay factor used to update the memory of the accumulation and reduces an influence of time drifting. The STO ($\hat{\tau}$) when an absolute value for the cost function depending on the above Equation 11 is maximum and the correlation result value ($\overline{\tilde{C}(\hat{\tau})}$) (hereinafter, referred to as a maximum correlation result value) at that time is as the following Equation 12. Here, $\tilde{C}(\hat{\tau})$ is the same as o_MaxVal_s1 described above, and $\hat{\tau}$ is the same as o_STO_s1 described above.

$$\hat{\tau} = \max_{\tau}\left\{\frac{|\tilde{C}(\tau)|}{|\overline{\tilde{C}(\tau)}|}\right\} \text{ and } \tilde{C}(\hat{\tau}) \qquad \text{Equation 12}$$

If $|\tilde{C}(\hat{\tau})|/|\overline{\tilde{C}(\tau)}|$ for $\tilde{C}(\hat{\tau})$ in the above Equation 12 is larger than i_ThdStep1 received from the synchronization detector 420, it becomes o_Done_s1 in an ON state or otherwise the o_Done_s1 is maintained in an OFF state, the processes S710 are repeated.

The following Table 8 shows an input signal for the functional interface of the first processor 421.

TABLE 8

| Signal Name | Signal Description | Signal Characteristics | | | Source |
|---|---|---|---|---|---|
| | | Type | Size | Rate | |
| i_Start_s1 | NPSS Step1 enable strobe | int | [1] | Radio-frame | NPSS Detector |
| o_Fail_s3 | NPSS Step3 fail strobe | int | [1] | Radio-frame | NPSS Step3 |

TABLE 8-continued

| Signal Name | Signal Description | Signal Characteristics | | | Source |
|---|---|---|---|---|---|
| | | Type | Size | Rate | |
| i_NumAcc | NPSS Step1 accumulation num | int | [1] | Radio-frame | NPSS Detector |
| i_ThdStep1 | NPSS Step1 threshold | double | [1] | Radio-frame | NPSS Detector |
| in240 | Filtered 240 kHz signal | dcomplx | [1] | Sampling Rate | SYNC Decimator |

The following Table 9 shows an output signal for the functional interface of the first processor 421.

TABLE 9

| Signal Name | Signal Description | Signal Characteristics | | | Destination |
|---|---|---|---|---|---|
| | | Type | Size | Rate | |
| o_MaxVal_s1 | NPSS Step1 Max Value | dcomplx | [1] | Radio-frame | NPSS Step2 |
| o_STO_s1 | NPSS Step1 STO | int | [1] | Radio-frame | NPSS Step4 |
| buf_rx240_s2_4 | NPSS Step1 output data | complex | [1] | Radio-frame | NPSS Step2 |
| o_Done_s1 | NPSS Step1 finish strobe | int | [1] | Radio-frame | NPSS Step2 |

Figure 10:
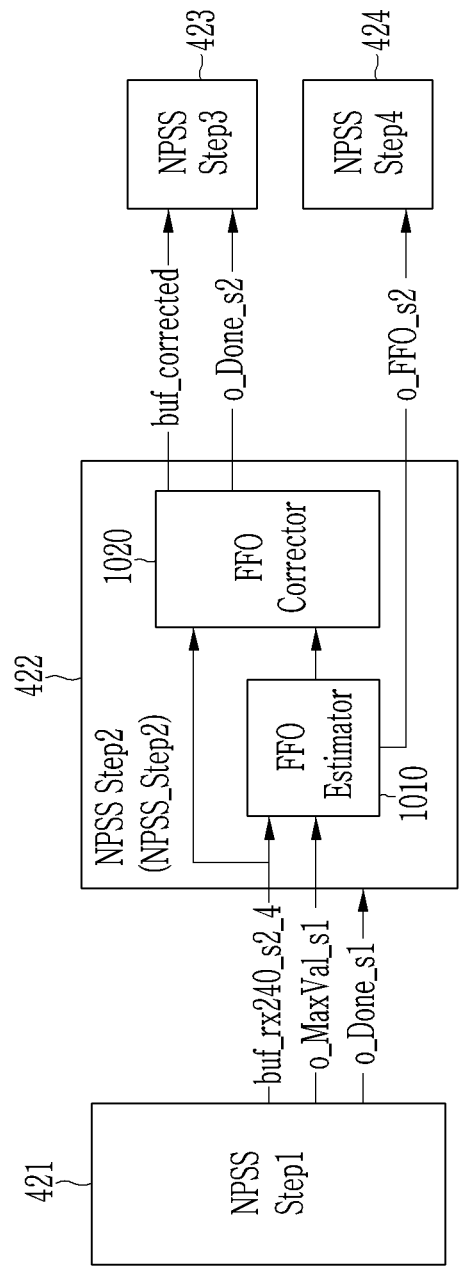
FIG. 10 is a block diagram illustrating a second processor according to an exemplary embodiment of the present invention.

FIG. 10 is a block diagram illustrating the second processor 422 according to the exemplary embodiment of the present invention.

As illustrated in FIG. 10, the second processor 422 according to the exemplary embodiment of the present invention includes a fractional fine, cross-correlation (FFO) estimator 1010 and an FFO corrector 1020. The second processor 422 is performed when receiving o_Done_s1=ON from the first processor 421.

The FFO estimator 1010 uses the maximum correlation result value o_MaxVal_s1=$\tilde{C}(\hat{\tau})$ received from the first processor 421 to estimate the FFO as the following Equation 13.

$$\hat{f}_F = \frac{64}{137\pi}\arg\{\tilde{C}(\hat{\tau})\}, \text{ where } -\pi \le \arg\{\cdot\} \le \pi \qquad \text{Equation 13}$$

The FFO estimator 1010 transmits an FFO value (i.e., o_FFO_s2=$\hat{f}_F$) estimated by the above Equation 13 to the fourth processor 424 (NPSS Step4).

The FFO corrector 1020 uses the FFO value ($\hat{f}_F$) estimated by the FFO estimator 1010 to perform the FFO correction as the following Equation 14. That is, the FFO corrector 1020 models samples (buf_rx240_s2_4[0-186]) received from the first processor 421 with y(n), n=0, 1, . . . , 186 as the following Equation 14 to generate an FFO corrected value (corrected output) (buf_correctred=$\hat{y}_F(n)$).

$$\hat{y}_F(n) = y(n)e^{-j2\pi\hat{f}_F\times 15\times 10^3\times n/(240\times 10^3)} \qquad \text{Equation 14}$$
$$= y(n)e^{-j\frac{\pi\hat{f}_F}{8}n}$$

When the FFO corrector 1020 calculates the above Equation 14 it is set to be o_Done_s2=ON, and the o_Done_s2=ON is transmitted to the third processor 423 along with the FFO corrected value (buf_corrected) of the above Equation 14.

The following Table 10 shows an input signal for the functional interface of the second processor 422.

TABLE 10

| Signal Name | Signal Description | Signal Characteristics | | | | |
|---|---|---|---|---|---|---|
| | | Type | Size | Rate | Source | |
| o_Done_s1 | NPSs Step1 finish strobe | int | [1] | Radio-frame | NPSS Step1 | |
| o_MaxVal_s1 | NPSS Step1 max value | dcomplx | [1] | Radio-frame | NPSS Step1 | |
| buf_rx240_s2_4 | NPSS Step1 buffered data | dcomplx | [187] | Radio-frame | NPSS Step1 | |

The following Table 11 shows an output signal for the functional interface of the second processor 422.

TABLE 11

| Signal Name | Signal Description | Signal Characteristics | | | | Destination |
|---|---|---|---|---|---|---|
| | | Type | Size | Rate | | |
| o_FFO_s2 | Estimated FFO | double | [1] | Radio-frame | | NPSS Step4 |
| buf_corrected | NPSS Step2 corrected data | dcomplx | [187] | Radio-frame | | NPSS Step3 |
| o_Done_s2 | NPSS Step2 finish strobe | int | [1] | Radio-frame | | NPSS Step3 |

Figure 11:
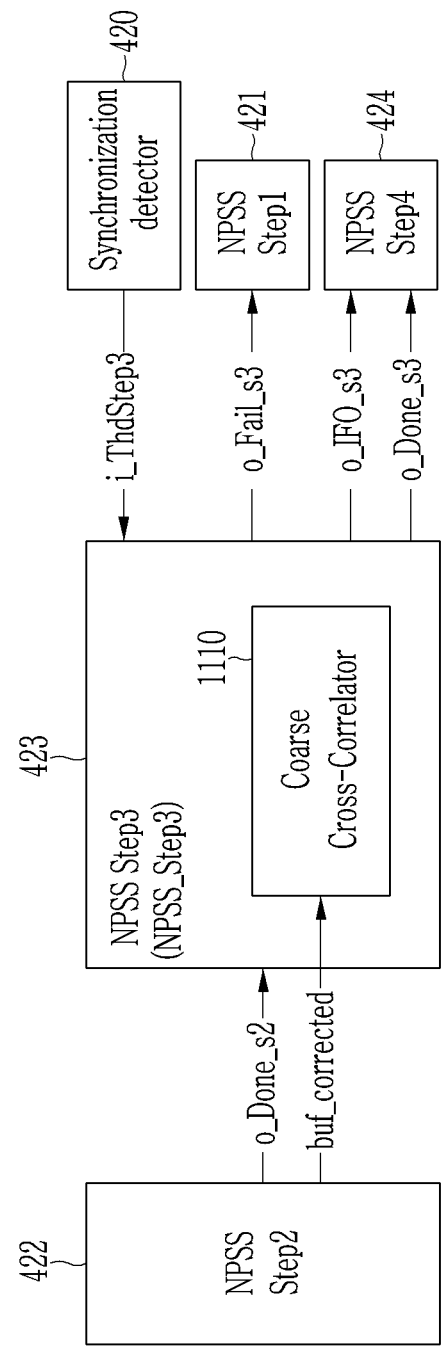
FIG. 11 is a block diagram illustrating a third processor according to an exemplary embodiment of the present invention.

FIG. 11 is a block diagram illustrating the third processor 423 according to the exemplary embodiment of the present invention.

As illustrated in FIG. 11, the third processor 423 according to the exemplary embodiment of the present invention includes a coarse to cross-correlator 1110. The third processor 423 is performed when receiving o_Done_s2=ON from the second processor 422.

The coarse cross-correlator 1110 performs the cross-correlation with time domain NPSS standard samples ($x_{npss}^{240\,kHz}(n)$, n=0, 1, 2, . . . , 11N−1) sampled at 240 kHz for an FFO corrected value (buf_corrected[0-186]=$\hat{y}_F(n)$, n=0, 1, 2, . . . , 11N−1) received from the second processor 422.

That is, the coarse cross-correlator 1110 performs a hypotheses for estimating an integer frequency offset (IFO) as the following Equation 15.

Equation 15

$$\hat{f}_I = \frac{128}{137} \arg_{\phi \in \{\pm 2, \pm 1, 0\}} D_{cross}\left(\hat{y}_F(n), x_{npss}^{240\,kHz}(n), \frac{128}{137}\phi\right)$$

where $$D_{cross}\left(\hat{y}_F(n), x_{npss}^{240\,kHz}(n), \frac{128}{137}\phi\right) =$$

$$\sum_{n=0}^{11N-1} \hat{y}_F(n)(x_{npss}^{240\,kHz}(n))^* e^{j2\pi(\frac{128}{137}\phi) \times 15 \times 10^3 \times n/(240 \times 10^3)} =$$

$$\sum_{n=0}^{11N-1} \hat{y}_F(n)(x_{npss}^{240\,kHz}(n))^* e^{-j\frac{\pi(\frac{128}{137}\phi)}{8}n}$$

In the above Equation 15, $\hat{f}_I$ having the largest absolute value of $D_{cross}$ among $\hat{f}_I$ values becomes a final IFO (o_IFO_s3). The final IFO(o_IFO_s3$\hat{f}_I$) is transmitted to the fourth processor 424. If the largest value among the absolute values of $D_{cross}$ is equal to or larger than i_ThdStep3 received from the synchronization detector 420, the o_Fail_s3 is turned off and the o_Done_s3 is turned on. If the largest absolute value is smaller than i_ThdStep3 received from the synchronization detector 420 the o_Fail_s3 is turned on and transmitted to the first processor 421 and the o_Done_s3 is turned ON.

The following Table 12 shows an input signal for the functional interface of the first processor 423.

TABLE 12

| Signal Name | Signal Description | Signal Characteristics | | | | Source |
|---|---|---|---|---|---|---|
| | | Type | Size | Rate | | |
| buf_corrected | NPSS Step2 corrected data | dcomplx | [187] | Radio-frame | | NPSS Step2 |
| o_Done_s2 | NPSS Step2 finish strobe | int | [1] | Radio-frame | | NPSS Step2 |
| i_ThdStep3 | NPSs Step3 threshold | float | [1] | Radio-frame | | NPSS Detector |

The following Table 13 shows an output signal for the functional interface of the third processor 423.

TABLE 13

| Signal Name | Signal Description | Signal Characteristics | | | | Destination |
|---|---|---|---|---|---|---|
| | | Type | Size | Rate | | |
| o_IFO_s3 | NPSS Step3 IFO | double | [1] | Radio-frame | | NPSS Step4 |
| o_Done_s3 | NPSS Step3 finish strobe | int | [1] | Radio-frame | | NPSS Step4 |
| o_Fail_s3 | NPSS Step3 fail strobe | int | [1] | Radio-frame | | NPSS Step1 |

Figure 12:
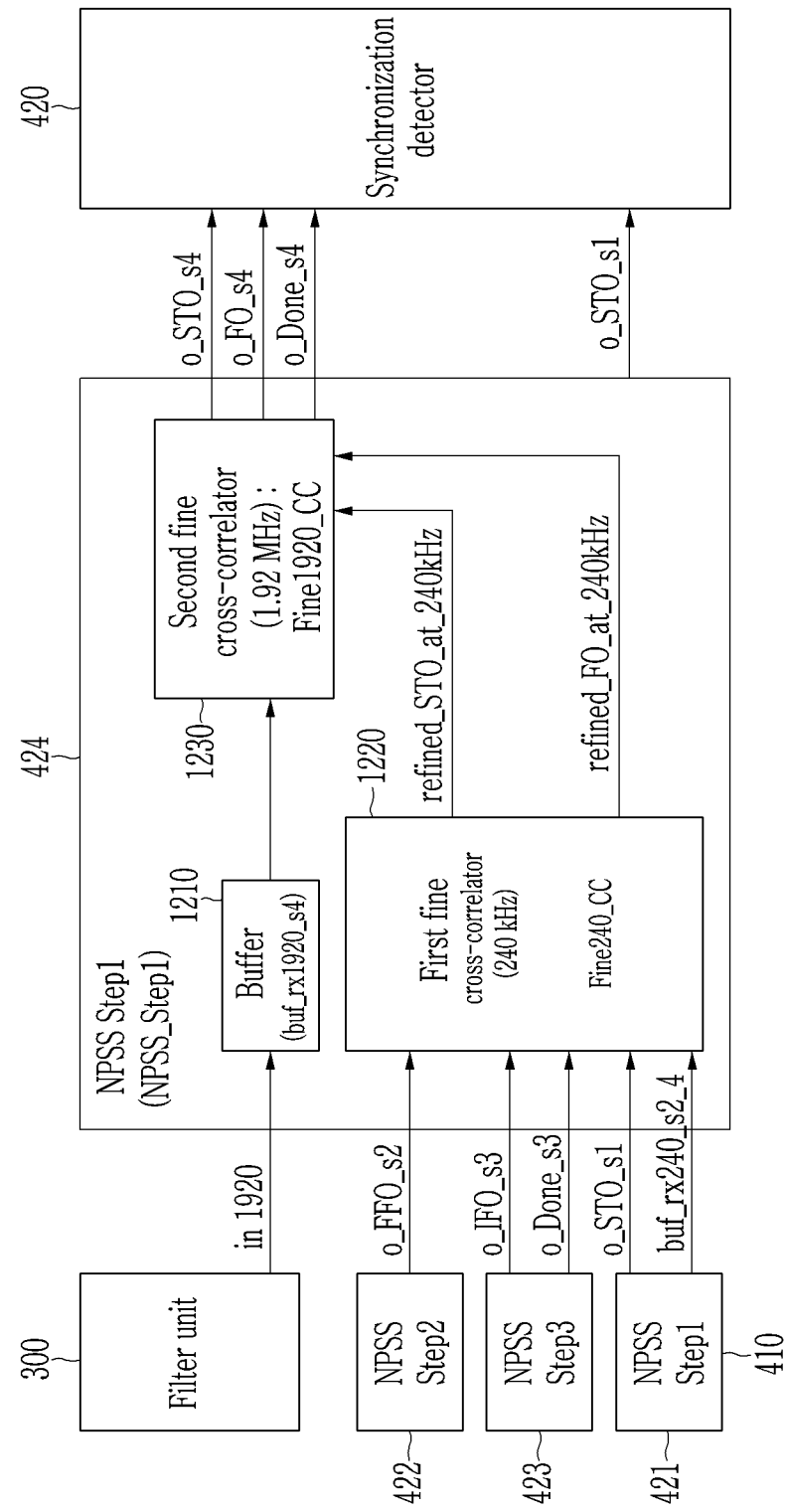
FIG. 12 is a block diagram illustrating a fourth processor according to an exemplary embodiment of the present invention.

FIG. 12 is a block diagram illustrating the fourth processor 424 according to the exemplary embodiment of the present invention.

The fourth processor 424 uses STO (o_STO_s1=$\hat{\tau}$) received from the first processor 421, FFO (o_FFO_s2=$\hat{f}_F$) received from the second processor 422, and IFO (o_IFO_s3=$\hat{f}_I$) received from the third processor 423 thereby estimating the STO and the FO finely again.

The fourth processor 424 according to the exemplary embodiment of the present invention includes a buffer 1210, a first fine cross-correlator 1220, and a second fine cross-correlator 1230. The first fine cross-correlator 1220 performs the fine cross-correlation on samples of 240 kHz, and the second fine cross-correlator 1230 performs the fine cross-correlation on samples of 1.92 MHz. The fourth processor 424 is performed when the o_Done_s3 received from the third processor 423 is turned on.

The first fine cross-correlator 1220 performs the cross-correlation on the samples (buf_rx240_s2_4=$y_{240}(n+\tau_{240})$) of 240 kHz input before and after the STO($\hat{\tau}$) estimated by the first processor 421 as many as samples indices within a period of $\tau_{240}$. That is, the first, fine cross-correlator 1220 performs the cross-correlation as the following Equation 16 to obtain up to $\hat{\tau}_{240}$ and $\hat{f}_{240,I+F}$. Here, $\hat{\tau}_{240}$ is refined_STO_at_240kHz and $\hat{f}_{240,I+F}$ is refined_FO_at_240kHz.

Equation 16

$$[\hat{\tau}_{240}, \hat{f}_{240}] = \arg\max_{\tau_{240}, f_{240}} D_{cross}(y_{240}(n+\tau_{240}), x_{npss}^{240kHz}(n), \tau_{240}, f_{240})$$

where $$D_{cross}(y_{240}(n+\tau_{240}), x_{npss}^{240kHz}(n), \tau_{240}, f_{240}) =$$

$$\sum_{n=0}^{11N-1} y_{240}(n+\tau_{240})(x_{npss}^{240kHz}(n))^* e^{-j\frac{\pi f_{240}}{8}n}$$

$$\tau_{240} \in [\hat{\tau} - \gamma 8\Delta\tau, \hat{\tau} + \gamma 8\Delta\tau]$$

$$f_{240} \in [\hat{f}_I + \hat{f}_F - \lambda\Delta f, \hat{f}_I + \hat{f}_F + \lambda\Delta f]$$

Figure 13:
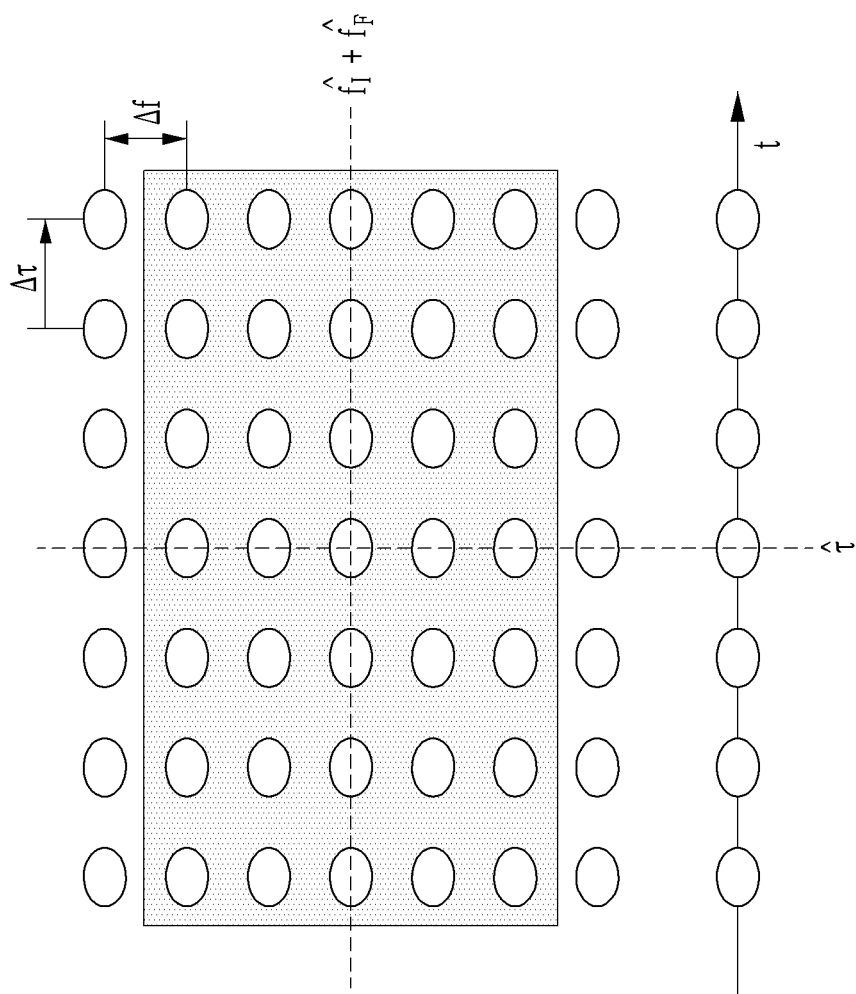
FIG. 13 is a diagram a time and frequency grid for fine cross-correlation according to an exemplary embodiment of the present invention.

FIG. 13 is a diagram a time and frequency grid for fine cross-correlation according to an exemplary embodiment of the present invention.

Referring to FIG. 13, $\Delta\tau = 1/(1.92\times10^6)$ in the above Equation 16 represents a minimum sample length that is finely tuned, and $\Delta f$ represents a minimum frequency offset. $\gamma$ represents a time domain tuning range before and after $\hat{\tau}$ estimated by the first processor 421, and $\lambda$ represents a frequency domain tuning range.

The second fine cross-correlator 1230 performs the cross-correlation on samples buf_rx1920_s4=$y_{1920}$ (n+$\tau_{1920}$) of the filter unit 300 input before and after STO (refined_STO_at_240kHz=$\hat{\tau}_{240}$) acquired by the first fine cross-correlator 1220 as many as sample indices within a section of $\tau_{1920}$. The second fine cross-correlator 1230 performs the cross-correlation on samples (buf_rx1920_s4=$y_{1920}$ (n+$\tau_{1920}$)) of the filter unit 300 input before and after FO(refined_FO_at_240kHz=$\hat{f}_{240}$)) acquired by the first fine cross-correlator 1220 as many as sample indices within a section of $f_{1920}$. That is, the second fine cross-correlator 1230 performs the cross-correlation as the following Equation 17 to finally obtain up to $\hat{\tau}_{1920}$ (o_STO_s4) and $\hat{f}_{1920}$ (o_FO_s4). $\hat{\tau}_{1920}$ (o_STO_s4) is a finally estimated STO value, and $\hat{f}_{1920}$ (o_FO_s4) is a finally estimated FO value.

Equation 17

$$[\hat{\tau}_{1920}, \hat{f}_{1920}] =$$

$$\arg\max_{\tau_{1920}, f_{1920}} D_{cross}(y_{1920}(n+\tau_{1920}), x_{npss}^{1.92MHz}(n), \tau_{1920}, f_{1920})$$

where $$D_{cross}(y_{1920}(n+\tau_{1920}), x_{npss}^{1.92MHz}(n), \tau_{1920}, f_{1920}) =$$

$$\sum_{n=0}^{11\times 8N-1} y_{1920}(n+\tau_{1920})(x_{npss}^{1.92MHz}(n))^* e^{-j\frac{2\pi f_{1920}\times 15\times 10^3}{1.92\times 10^6}n}$$

$$\tau_{1920} \in [8\hat{\tau}_{240} - \gamma'\Delta\tau, 8\hat{\tau}_{240} + \gamma'\Delta\tau]$$

$$f_{1920} \in [\hat{f}_{240} - \lambda'\Delta f, \hat{f}_{240} + \lambda'\Delta f]$$

Referring to FIG. 13, in the above equation 17, $\gamma'$ represents the time domain tuning range before and after $8\hat{\tau}_{240}$, $\lambda'$ represents the frequency domain tuning range before and after $\hat{f}_{240}$.

If the execution of the above Equation 17 is completed, the fourth processor 424 transmits o_Done_s4=ON to the synchronization detector 420 and is disabled.

The following Table 14 shows an input signal for the functional interface of the fourth processor 424.

TABLE 14

| Signal Name | Signal Description | Signal Characteristics | | | |
|---|---|---|---|---|---|
| | | Type | Size | Rate | Source |
| o_Done_s3 | NPSS Step3 finish strobe | int | [1] | Radio-frame | NPSS Step3 |
| o_STO_s1 | NPSS Step1 STO | int | [1] | Radio-frame | NPSS Step1 |
| o_FFO_s2 | NPSS Step2 FFO | double | [1] | Radio-frame | NPSS Step2 |
| o_IFO_s3 | NPSS Step3 FFO | double | [1] | Radio-frame | NPSS Step3 |
| in1920 | Filtered input signal at 1.92 MHz | dcomplx | [1] | Sampling Rate | 180-kHz BW Filter |
| buf_rx240_s2_4 | Filtered input signal at 240 kHz | dcomplx | [187+] | Radi8o-frame | SYNC Decimator |

The following Table 15 shows an output signal for the functional interface of the fourth processor 424.

TABLE 15

| Signal Name | Signal Description | Signal Characteristics | | | Destination |
|---|---|---|---|---|---|
| | | Type | Size | Rate | |
| o_STO_s4 | Final STO | int | [1] | Radio-frame | NPSS Detector |
| o_FO_s4 | Final FO | double | [1] | Radio-frame | NPSS Detector |
| o_Done_s4 | PSS Step4 finishstrobe | int | [1] | Radio-frame | NPSS Detector |

As described above, according to the exemplary embodiment of the present invention, the coarse auto-correlation method and the fine cross-correlation method are interchangeably used with each other to implement the low-power, low-cost, and high-performance receiver.

Although the exemplary embodiment of the present invention has been described in detail hereinabove, the scope of the present invention is not limited thereto. That is, several modifications and alterations made by those skilled in the art using a basic concept of the present invention as defined in the claims fall within the scope of the present invention.

What is claimed is:

1. A method for acquiring, by a receiver, synchronization in the Internet of things based on a primary synchronization signal received from a transmitter, the method comprising:
   sampling the primary synchronization signal into a digital signal to generate a first sampling signal;
   down sampling the first sampling signal into a second sampling signal; and
   estimating a first sample timing offset (STO) and a first frequency offset (FO) using the first sampling signal and the second sampling signal,
   wherein the estimating includes calculating a second STO and a correlation result value for the second STO by sliding auto-correlation and smoothing correlation, and
   wherein the calculating of the second STO includes:
   performing the sliding auto-correlation using the second sampling signal;

performing the smoothing correlation by performing averaging and filtering on temporally adjacent values among values calculated by the sliding auto-correlation;
defining a cost function by performing weighted combining on the values calculated by the smoothing correlation;
setting an STO value to be the second STO when the cost function is maximum; and
setting the cost function value for the second STO to be the correlation result value,
wherein the estimating of the STO and the FO includes finally estimating the first STO, and
wherein the finally estimating includes performing a couple of cross-correlations.

2. The method of claim 1, further comprising:
filtering the first sampling signal, wherein the down sampling includes down sampling the filtered first sampling signal into the second sampling signal.

3. The method of claim 1, wherein: the first sampling signal is a 1.92 MHz sampling signal, the second sampling signal is a 240 kHz sampling signal.

4. The method of claim 1, wherein the estimating includes performing sliding auto-correlation, smoothing correlation, and fine cross-correlation using the first sampling signal and the second sampling signal to estimate the first STO and the first FO.

5. The method of claim 1, wherein the estimating of the STO and the FO further includes:
estimating a fractional frequency offset (FFO) using the correlation result value; and
correcting the FFO using the second sampling signal and the FFO.

6. The method of claim 5, wherein the estimating of the STO and the FO further includes performing cross-correlation on the corrected FFO and the second sampling signal to estimate an integer frequency offset (IFO).

7. The method of claim 6, wherein the estimating of the STO and the FO further includes finally estimating the first STO and the FO using the second STO, the FFO, and the IFO.

8. The method of claim 7, wherein the finally estimating further includes:
performing a first cross-correlation using the second STO, the FFO, the IFO, and the second sampling signal; and
performing a second cross-correlation using the result value for the first cross-correlation and the first sampling signal to finally estimate the first STO and the first FO.

9. A method for acquiring, by a terminal, synchronization in the Internet of things based on a primary synchronization signal received from a transmitter, the method comprising:
sampling the primary synchronization signal into a digital signal to generate a first sampling signal;
filtering the first sampling signal;
down sampling the filtered first sampling signal into a second sampling signal; and
performing sliding auto-correlation and cross-correlation using the first sampling signal and the second sampling signal to estimate a first sample timing offset (STO) and a first frequency offset (FO),
wherein the estimating of the STO and the FO includes calculating a second STO and a correlation result value for the second STO by sliding auto-correlation and smoothing correlation, and wherein the calculating of the second STO includes:
performing the sliding auto-correlation using the second sampling signal;
performing the smoothing correlation by performing averaging and filtering on temporally adjacent values among values calculated by the sliding auto-correlation;
defining a cost function by performing weighted combining on the values calculated by the smoothing correlation; and
setting an STO value to be the second STO when the cost function is maximum; and
setting the cost function value for the second STO to be the correlation result value,
wherein the estimating of the STO and the FO includes finally estimating the first STO, and
wherein the finally estimating includes performing a couple of cross-correlations.

10. The method of claim 9, wherein the estimating of the STO and the FO further includes:
estimating a fractional frequency offset (FFO) using the correlation result value; and
correcting the FFO using the second sampling signal and the FFO.

11. The method of claim 10, wherein the estimating of the STO and the FO includes:
performing a first cross-correlation on the corrected FFO and the second sampling signal to estimate an integer frequency offset (IFO);
performing a second cross-correlation using the second STO, the FFO, the IFO, and the second sampling signal; and
performing a third cross-correlation using the result value for the first cross correlation and the filtered first sampling signal to finally estimate the first STO and the first FO.

12. A receiver comprising:
an analog-digital converter implemented by a processor sampling a primary synchronization signal received from a transmitter into a digital signal to generate a first sampling signal comprising:
a filter implemented by a processor filtering the first sampling signal;
a synchronization decimator implemented by a processor down sampling the filtered first sampling signal into a second sampling signal; and
a synchronization detector estimating a first sample timing offset (STO) and a first frequency offset (FO) using the first sampling signal and the second sampling signal,
wherein the synchronization detector includes a first processor calculating a second STO and a correlation result value for the second STO by sliding auto-correlation and smoothing correlation, and
wherein the first processor includes:
a sliding auto-correlator performing the sliding auto-correlation using the second sampling signal and performing the smoothing correlation by performing averaging and filtering on temporally adjacent values among values calculated by the sliding auto-correlation; and
a coherent combiner implemented by a processor defining a cost function by performing weighted combining on the values calculated by the smoothing correlation, setting the STO value to be as the second STO when the cost function is maximum, and setting the value of the cost function for the second STO as the correlation result value, wherein the estimating of the STO and the FO includes finally estimating the first STO, and wherein the finally estimating includes performing a couple of cross-correlations.

13. The receiver of claim 12, wherein the synchronization detector performs sliding auto-correlation, smoothing correlation, and fine cross correlation using the first sampling signal and the second sampling signal to estimate the first STO and the first FO.

14. The receiver of claim 12, wherein the synchronization detector includes:
   a first processor calculating a second STO and a correlation result value for the second STO by sliding auto-correlation and smoothing correlation; and
   a second processor estimating a fractional frequency offset (FFO) using the correlation result value and correcting the FFO using the second sampling signal and the FFO.

15. The receiver of claim 14, wherein the synchronization detector further includes:
   a third processor performing a first cross-correlation on the corrected FFO and the second sampling signal to estimate an integer frequency offset (IFO); and
   a fourth processor performing a second cross correlation using the second STO, the FFO, the IFO, and the second sampling signal and performing a third cross-correlation using the result value for the first cross-correlation and the filtered first sampling signal to finally estimate the first STO and the first FO.

16. The receiver of claim 12, wherein the frequency of the first sampling signal is 8 times as large as that of the second sampling signal.

17. The receiver of claim 12, further comprising a physical layer controller applying the first FO for an automatic frequency control.

* * * * *